Aug. 20, 1968  W. J. JACKSON, JR., ET AL  3,398,212
BISPHENOL POLYCARBONATES AND POLYESTERS CONTAINING
UNITS DERIVED FROM A THIODIPHENOL
Filed May 2, 1967
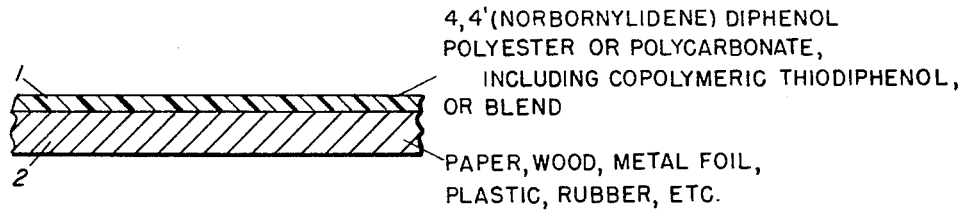
FIG. I
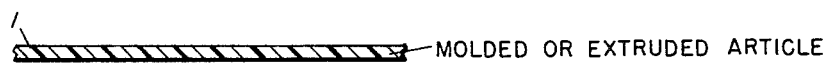
FIG. 2
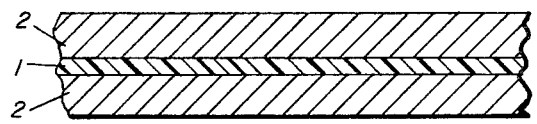
FIG. 3
INVENTORS
WINSTON J. JACKSON, JR.
JOHN R. CALDWELL
BY William J. French
Thomas A. Hodge
ATTORNEYS United States Patent Office
3,398,212
Patented Aug. 20, 1968

3,398,212
BISPHENOL POLYCARBONATES AND POLYESTERS CONTAINING UNITS DERIVED FROM A THIODIPHENOL
Winston Jerome Jackson, Jr., and John Richard Caldwell, Kingsport, Tenn., assignors to Eastman Kodak Company, Rochester, N.Y., a corporation of New Jersey
Continuation-in-part of application Ser. No. 292,139, July 1, 1963. This application May 2, 1967, Ser. No. 635,519
12 Claims. (Cl. 260—860)

ABSTRACT OF THE DISCLOSURE

Bisphenol polycarbonates and polyesters useful as molded objects, fibers, films, etc., are prepared from a polycyclic bisphenol [such as 4,4'-(2-norbornylidene)diphenol] and a thiodiphenol [such as 4,4'-thiodiphenol]. The thiodiphenol unit imparts improved oxidative stability to these polymers without substantially lowering the tensile or thermal properties.

---

This application is a continuation-in-part of Caldwell and Jackson U.S. Ser. No. 292,139, filed July 1, 1963.

This invention relates to new polycarbonates and polyesters, and to shaped articles thereof. In one of its more specific aspects, this invention relates to copolycarbonates and copolyesters prepared from polycyclic bisphenols and thiodiphenols, and to blends of polymers comprising polycyclic bisphenol moieties in the polymer chain with polymers comprising thiodiphenol moieties in the chain.

Although many bisphenol polycarbonates and polyesters have good oxidative stability, these polymers are not sufficiently stable for very prolonged use in air at temperatures of 200° C. and higher. For various reasons, the addition of conventional antioxidants has disadvantages. Phenolic and aromatic amine antioxidants tends to interact with the carbonate and ester linkages of the polymers at elevated temperatures and cause polymer degradation. Antioxidants also may adversely affect the excellent electrical properties of the polymers. Many conventional antioxidants do not have satisfactory permanence and migrate to other materials or environments, particularly when the polymer is heated to high temperatures. Often when appreciable amounts of conventional antioxidants are added, they adversely affect the tensile strength and thermal properties of the polymers. some common antioxidants are unsuitable because of unattractive colors thereof or of degradation products which develop with age. Odor and toxicity are often deterrents to the use of otherwise excellent antioxidants.

It has been proposed to utilize a thiodiphenol as a dihydroxy monomer in polymers. However, such polymers may have poor thermal properties, such as poor glass transition temperature. For example, 4,4'-thiodiphenol polycarbonate has a glass transition temperature of only 113° C. One modification proposed has been to prepare a copolycarbonate, for example, of the thiodiphenol and other diphenols such as bisphenol A. Bisphenol A polycarbonate has a glass transition temperature of 149° C. A copolycarbonate of equimolar amounts of bisphenol A and 4,4'-thiodiphenol has a glass transition temperature of only 125° C. Therefore, there is a need in the industry for polycarbonates and polyesters which have improved oxidative stability and good tensile and thermal properties.

Accordingly, one of the objects of this invention is to provide polycarbonates, polyesters, and blends of such polymers containing a polycyclic bridged ring in the polymer chain, wherein the polymer or blend contains a unit derived from a thiodiphenol.

Another object of this invention is to provide such polycarbonates and polyesters having improved oxidative stability, particularly at temperatures of 200° C. and higher.

Yet another object of this invention is to provide such polymers without substantially lowering the tensile or thermal properties.

Other objects of this invention will become apparent herein.

These and other objects are attained through the practice of this invention, at least one embodiment of which comprises providing a highly polymeric linear organic polyester of (A) at least one bifunctional carboxylic acid selected from the group consisting of carbonic acid and dicarboxylic acids, (B) at least one polycyclic gem-bisphenol having a saturated polycyclic three-dimensional structure which includes a saturated bicyclic atomic-bridged hydrocarbon ring member, and (C) at least one thiodiphenol, said polyester having an inherent viscosity of at least 0.4 as measured in chloroform.

These and other objects are also attained through the practice of this invention, another embodiment of which comprises providing a blend of (1) a highly polymeric linear organic polyester of (A) and (B) above and (2) a highly polymeric linear organic polyester of (A) and (C) above, said polyester having an inherent viscosity of at least 0.4 as measured in chloroform.

The generic scope of the term "polyester" is well known in the polymer art as encompassing both polyesters and polycarbonates, although there are some distinguishing features in the more particular class of polyesters known as polycarbonates. Such a definition is intended herein as will be evident from the description of this invention. In addition, the term "thiodiphenol" will be understood to include both unsubstituted and substituted thiodiphenol, examples of which are presented in the description of this invention.

The above-referred to polycyclic gem-bisphenols may be represented by the general formula:

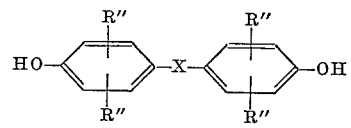

wherein $R''$ is a member selected from the group consisting of hydrogen atoms, halogen atoms, and alkyl groups containing from 1 to 4 carbon atoms and X is gem-bivalent radical consisting essentially of a saturated polycyclic structure which includes at least one saturated bicyclic atomic-bridged hydrocarbon ring member.

In the drawings, FIG. 1 shows a substrate 2 coated with a layer 1 of the polymer of this invention, both in cross-section. FIG. 2 illustrates a section of a molded or extruded article 2. The polymer of the invention in a laminate is shown in cross-section in FIG. 3. The numerals have the same significance in each figure.

The preferred polymers of the invention have structures in the polymer chains which may be represented by the following units:

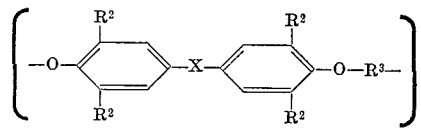

I.

wherein each $R^2$ is, independently, a member selected from the group consisting of H, halogen, and lower alkyl containing from 1 to about 4 carbon atoms, such as methyl, ethyl, propyl, isopropyl, butyl, or isobutyl, $R^3$ is, for the polycarbonate, carbonyl, and for the polyester, alkoyl or, aroyl, preferably isophthaloyl, terephthaloyl, or hexahydroterephthaloyl, and X is sulphur or is selected from the group of radicals having the following formulas:

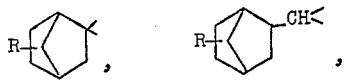 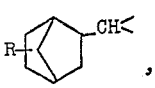

 and 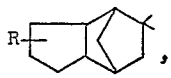

wherein R is at least one member which is attached to one or more of the polycyclic rings and is selected from the group consisting of hydrogen atoms, halogen atoms, aryl groups, and alkyl groups containing from 1 to 4 carbon atoms.

An example of a polyester falling within the foregoing formula for the polymer and derived in this instance from terephthalic acid and 4,4'-(2-norbornylidene)diphenol, is the following:

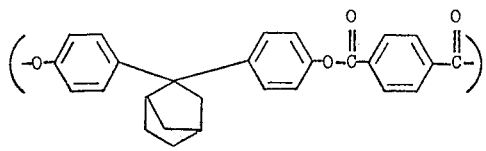

II.

wherein the unit is repeated in a homopolymer or in a copolymer including units derived from other diphenols and/or dicarboxylic acids. Polymers having the immediately foregoing structure are disclosed in said application Ser. No. 292,139. An example of a polyester derived from the same acid and from 4,4'-thiodiphenol is:

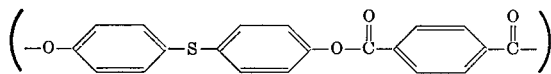

III.

This may be utilized as a homopolymer, or may appear in a copolymer including the units of the preceding formula, in any desired amount, as discussed more particularly hereinafter. The proportions may also vary in the event physical blends of the two homopolymers are prepared.

A representative polycarbonate, derived from 4,4'-(2-norbornylidene)diphenol is:

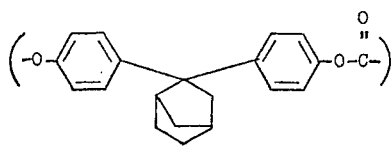

IV.

which is repeated in the polymer chain. The repeating unit of a polycarbonate of 4,4'-thiodiphenol has the structure:

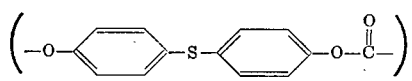

V.

As is pointed out elsewhere herein, position isomers of the thiodiphenols are useful, and other substituents may be present on the ring. However, it is important that the thiodiphenol contains no dithio(—S—S—) linkages as these are unstable and cleave on oxidation. In the case of copolycarbonates, each of the foregoing two units appear in the polymer chain in any proportion desired, as will be discussed further.

It is to be understood that polymers having each of the structures designated by the Formulae II, III, IV, and V are known to the art or are novel as shown in said application Ser. No. 292,139. The invention resides in combining polymer structures such as are shown, for example, in Formulae II and III, or in Formulae IV and V, either as copolymers or physical blends. It will also be apparent that Formulae II, III, IV, and V are given by way of example only, and that equivalent polymers may be derived from related polycyclic dihydroxy compounds, from related dicarboxylic acids, and from related thiodiphenols. A portion of the structures may be derived from other dihydroxy compounds, and in the case of polyesters, from still other types of dicarboxylic acids. Stated broadly, the invention comprises novel polycarbonates and other polyesters from certain bisphenols and the novel bisphenols. The particular polymers of this invention are condensed from bisphenols in which the bivalent connecting radical of the bisphenol contains a three-dimensional polycyclic structure containing an atomic bridge. In all of the bisphenols which characterize the invention, the two phenol groups are attached to a single carbon atom of the bivalent connecting radical. Bisphenols having this linkage can be called "gem-bisphenols."

The linear polymers of the invention include polyesters of carbonic acid, called polycarbonates, and polyesters of dicarboxylic acids, which can be called dicarboxylic acid polyesters to distinguish them from the polycarbonates.

An approximate representation which shows the three-dimensional nature of the norbornane ring is as follows:

While the norbornane nucleus has been emphasized above, the invention extends to gem-bisphenols having other nuclei. There may be additional saturated rings in the polycyclic structure in addition to the bicyclic member which contains the atomic bridge. These may be joined by fused or spiro-union linkages in the polycyclic structure. Atomic bridges may also occur in the additional member rings of the polycyclic structure. There may be alkyl, halogen, or aromatic substituents in the connecting radical.

The atomic bridge within the polycyclic structure may have more than one carbon atom, e.g. (bicyclo[2.2.2]octane)

There may be more than one bridge in the polycyclic structure: e.g. (tricyclo[2.2.1.0$^{2,6}$]heptane)

(adamantane)

The atomic bridge may consist of an oxygen or nitrogen atom instead of carbon: e.g. (7-oxabicyclo[2.2.1]heptane)

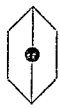

There may be alkyl, aryl and halide substituents on the polycyclic structure: e.g. (substituted norbornane)

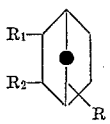

R, $R_1$, and $R_2$=H, halogen, alkyl ($C_1$–$C_4$), and aryl. Also, two substituents may be attached to the same carbon atom. Of course all of these substituents must be in positions which do not interfere with formation of the bisphenol. Because of steric effects, certain bisphenols cannot be obtained, e.g., those from some norbornane derivatives with two alkyl or halogen substituents in the 3 or 7 positions.

Additional saturated rings may be fused to the bicyclic bridged ring member in the polycyclic structure. These may be hydrocarbon or heterocyclic rings, e.g. (hexahydro-4,7-methanoindane)

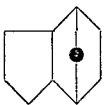

(octahydro-4,7-methanoisobenzofurane)

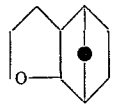

There may be additional bridges in the fused rings, e.g. (decahydro-1,4,5,8-dimethanonaphthalene)

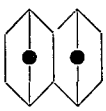

(dodechaydro - 4,9,5,8 - dimethano-1-cyclopenta(b)naphthalene)

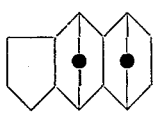

Additional saturated rings may be joined in the polycyclic structure by spiro-union linkage, e.g. (spiro[cyclopropane-1,7′-norbornane])

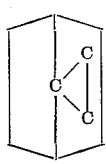

Linear polycarbonates can be prepared by condensation of phosgene or a bischloroformate of a diol, or a mixture of these, with one or more diols including the novel three-dimensional polycyclic bisphenols and/or thiodiphenols. It will be apparent that the polycarbonates formed by condensing either phosgene or diol bischloroformates with the same or different diols, can be described as consisting essentially of recurring residues of carbonic acid and the diols. By condensing the bischloroformate of one diol with another diol, homogeneous polycarbonates having regularly recurring residues will be obtained, whereas copolycarbonates will be obtained having randomly recurring residues when a mixture of diols are condensed with phosgene.

Linear dicarboxylic acid polyesters can be prepared by condensation of one or more organic dicarboxylic acids, or dicarboxylic acid diesters, with one or more diols including, at least in part, one of the polycyclic bisphenols contemplated by the present invention and/or thiodiphenols. By whatever condensation process the polyesters are formed, they can be described as polymers consisting essentially of condensation residues of dicarboxylic acids and diols.

While the 4,4′-diphenol compounds are preferred, as represented by the formula for the polymers

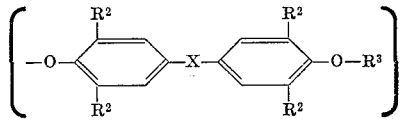

given above, position isomers are included, and a more general formula is

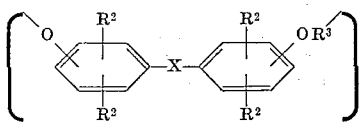

with $R^2$ and $R^3$ having the meaning given heretofore. Thus, examples of thiodiphenols which are useful in the invention are 4,4′-thiodiphenol, 2,2′-thiodiphenol, 4,4′-thiobis(2-methyl)phenol, 4,4′-thiobis(3-methyl)phenol, 4,4′-thiobis(2-chloro)phenol, and 4,4-thiobis(2,6-dimethyl)phenol. The same position isomerism applies in the case of the three-dimensional polycyclic (i.e. bridged) bisphenols, as has been suggested elsewhere herein. The 4,4′-derivatives are preferred for the reason that the polymers obtained have higher melting points than do the polymers derived from other position isomers.

Gem-bisphenols useful in the invention include 4,4′-(2-norbornylidene)diphenols such as 4,4′-(5,6-dimethyl-2-norbornylidene)diphenol;

4,4′-(2-norbornylmethylene)-diphenols such as 4,4′-(3-phenyl-2-norbornylmethylene)diphenol and 4,4′-(2-norbornylmethylene)-bis[2,6-dichlorophenol];

4,4′ - (hexahydro-4,7-methanoindan-5-ylidine)-diphenols such as 4,4′-(hexahydro-4,7-methanoindan-5-ylidene)-di-o-cresol;

4,4′ - (dodecahydro - 4,9,5,8-dimethano-1-cyclopenta(b)-naphthalene-6-ylidene)diphenol;

4,4′ - decahydro - 1,4:5,8-dimethanonaphth-2-ylidene)diphenols such as 4,4′(decahydro-1,4-exo-5,8-endo-dimethanonaphth-2-ylidene)-bis[2,6-dichlorophenol];

4,4′-(decahydro-1,4:5,8-dimethanonaphth-2-ylmethylene) diphenol;

4,4′-(hexahydro-4,7-methanoindan-2(or 3, or 5)-ylmethylene)diphenols;

4,4′-(hexahydro-4,7-methanoindan-1-ylidene)-diphenol;

4,4′ - (octahydro-4,7-methanoisobenzo-furan-6-ylidene)-diphenol;

4,4′-(bicyclo[3.2.1]oct-2-ylidene)diphenols such as 4,4′-bicyclo[3.2.1]oct-2-ylidene)bis[2,6-dichlorophenol];

4,4′-bicyclo[3.2.2]non-2-ylidene)diphenol;

4,4′-(bicyclo[2.2.2]oct-2-ylmethylene)diphenol or the halogen-containing derivatives thereof;

4,4′ - (spiro[cyclopropane-1,7′-norborn-2′-yl]methylene)-diphenols; and the 4,4′-(tricyclo-[2.2.1.0$^{2,6}$]heptan-3-ylidene)diphenols.

Said application Ser. No. 292,139 is referred to as teaching the preparation of these compounds.

BISPHENOL POLYCARBONATES

Polycarbonates from bisphenols may be prepared by adding phosgene and/or a bischloroformate of the thiodiphenol and/or the gem-bisphenol to a cooled, stirred aqueous mixture containing sodium hydroxide, the bisphenol, a catalyst, and methylene chloride phase.

The diol, if other than or in addition to the thiodiphenol and/or the gem-bisphenol, from which the bischloroformate is prepared may be aromatic, aliphatic, or alicyclic, and may be primary, secondary, or tertiary. The carbon chain of aliphatic diols may be straight, or branched and may contain from 2 to 20 carbon atoms. Examples of diols are ethylene glycol; 1,6-hexanediol; 1,4-hexanediol; 1,4-cyclohexanedimethanol; p-xylylenediol; 2,5-norbornanediol; trans-1,4-cyclohexanediol; 2,5-dimethyl-2,5-hexanediol; hydroquinone; and 4,4'-isopropylidenediphenol. Also any of the following groups may be present in the molecule (R=alkyl or aryl): —$R_2C$—, —O—, —$OCH_2CH_2O$—, —SO—, —$SO_2$—, —$SO_2NR$—, —NR—, —CONH—, —CO—, —COO—, $CF_2$,

—NRNR—

—CH=CH—, —C≡C—, —S—, phenylene, cyclohexylene, etc.

In addition to the interfacial process for preparing the polycarbonates of this invention, these polymers may also be prepared by adding phosgene and/or the diol bischloroformate to a stirred mixture containing the thiodiphenol and/or the gem-bisphenol and a tertiary amine, such as pyridine or triethylamine. A portion of the tertiary amine may be replaced with a solvent of the polymers, such as methylene chloride. In contrast to the interfacial process, in this process it is not necessary to add nonaromatic diols in the form of their bischloroformates—the diols themselves may be added. Copolycarbonates are then obtained when phosgene is added to the bisphenol/diol mixture in the tertiary amine.

These polycarbonates also may be prepared by the ester interchange process, that is, by heating the thiophenol and/or the gem-bisphenol, diaryl carbonate, and a suitable catalyst under reduced pressure. Satisfactory diaryl carbonates include diphenyl carbonate, ditolyl carbonate, dixylyl carbonate, and dinitrophenyl carbonate.

The polycarbonates of this invention include copolymers. Copolycarbonates are prepared by condensing a mixture of the thiodiphenol and/or gem-bisphenol with phosgene or the diol bischloroformate or the diaryl carbonate, or thiodiphenol with a mixture including another diol bischloroformate. Block copolycarbonates are prepared by condensing a mixture of low-molecular weight homopolycarbonates with phosgene. Mixed copolymers are prepared by condensing the thiodiphenol and/or gem-bisphenol with a bischloroformate of a polymeric diol (e.g., polyethylene oxide bischloroformate).

Bisphenols which may be used with the bisphenols of this invention for preparing copolycarbonates include 4,4'-isopropylidenediphenol (also known as bisphenol A); 4,4' - isopropylidenebis[2,6-dichlorophenol]; 4,4'-isopropylidenebis[2,6 - dibromophenol]; cyclohexylidenediphenol; cyclohexylmethylenediphenol; 4,4' - sulfonyldiphenol; 4,4'-oxydiphenol; 4,4'-dihydroxydiphenyl; 4,4'-methylenediphenol; hydroquinone; resorcinol; 1,4-naphthalenediol; 2,5-naphthalenediol; and other bisphenols listed in U.S. Patent 3,030,335. Also useful are 4,4'-(3-cyclohexen - 1 - methylene)diphenol; 3,3 - bis(4-hydroxyphenyl)butene; 4,4'-dihydroxybenzophenone; and the like.

BISPHENOL POLYESTERS

The dicarboxylic acid polyesters of this invention are prepared by condensing the novel polycyclic bisphenols and/or the thiodiphenols with dicarboxylic acids by ester interchange reactions between these bisphenols and esters of aliphatic, cycloaliphatic, and aromatic dicarboxylic acids. In place of the preferred isophthalic, terephthalic, and hexahydrophthalic acids mentioned heretofore, others are useful. Phenyl or cresyl esters of the dicarboxylic acids are convenient to use. Suitable aliphatic dicarboxylic acids include oxalic, dimethylmalonic, succinic, glutaric, adipic, pimelic, azelaic, sebacic, and 2-methyladipic. Suitable cycloaliphatic acids include cyclohexane-1,4-dicarboxylic acid, cyclohexane-1,3-dicarboxylic acid, cyclopentane-1,3-dicarboxylic acid, and 2,5-norbornane-dicarboxylic acid. Either cis- or trans-forms of the acids may be used. Suitable aromatic dicarboxylic acids include 1,4-naphthalic, t-butylisophthalic, diphenic, 4,4'-sulfonyldibenzoic, 4,4'-oxydibenzoic, and 2,5-naphthalenedicarboxylic. Other suitable acids are those found in column 7 of U.S. Patent 2,720,506. Mixtures containing two or more acids, two or more bisphenols or an aliphatic or cycloaliphatic glycol with the bisphenol may be used to give copolyesters.

Bisphenols which may be added with the polycyclic bisphenols and/or to the thiodiphenols to give copolyesters include 4,4'-isopropylidenediphenol (commonly known as bisphenol A); 4,4'-isopropylidenebis[2,6-dichlorophenol]; 4,4' - isopropylidenebis[2,6 - dibromophenol]; cyclohexylidenediphenol; cyclohexylmethylenediphenol; 4,4'-sulfonyldiphenol; 4,4'-oxydiphenol; 4,4'-dihydroxydiphenyl; 4,4' - methylenediphenol; hydroquinone; resorcinal; 1,4-naphthalenediol; 2,5-naphthalenediol, and other bisphenols listed in U.S. Patent 3,030,335. Block copolyesters are included.

The ester interchange between a bisphenol and the phenyl or cresyl ester of the dicarboxylic acid is catalyzed by the oxide, hydroxide, or hydride of an alkali metal or alkaline earth metal or by the free alkali or alkaline earth metal itself. Other suitable catalysts include zinc oxide, lead oxide, dibutyltin oxide, sodium aluminate, butyl lithium, and phenyl lithium.

The usual method is followed of heating the reactants under vacuum to remove phenol or cresol as the condensation proceeds. It is preferred to build up final molecular weight by the solid-phase process in which the granulated polymer is heated in a vacuum at a temperature somewhat below the melting point. It is difficult with the polyesters of this invention to build up molecular weight by melt polymerization due to the very high melt viscosities inherent in the polymers.

Polycarboxylates may also be prepared from the dicarboxylic acid chlorides by heating a mixture of equivalent amounts of bisphenol and acid chloride at temperatures from 160–280° C. or higher, or they may be reacted in a basic solvent such as pyridine or in a 2-phase system consisting of aqueous alkali and organic solvent phases as described in J. Poly. Sc. 40, 399 (1959).

Another process involves the ester interchange reaction of a monobasic aliphatic acid ester of the bisphenol with a dicarboxylic acid. The ester is heated with the acid to promote ester interchange with elimination of the monobasic acid. The final stage of the polymerization is carried out under vacuum. A catalyst such as manganese will speed the reaction.

As has been suggested above, the polymers of the invention may be modified in a number of ways as indicated by the following table.

| | Copolymer or Blend | Optional Modifier or Comonomer |
|---|---|---|
| 1 | Copolycarbonate of polycyclic bisphenol and thiodiphenol. | Other diphenol or diol in place of part of either or both diphenols. |
| 2 | Copolyester of dicarboxylic acid, polycyclic bisphenol, and thiodiphenol. | One or more additional dicarboxylic acids, other diphenol or diol in place of part of either or both diphenols. |
| 3 | Blend of polycyclic bisphenol polycarbonate and thiodiphenol polycarbonate. | Other diol or diphenol in place of part of either or both diphenols. |
| 4 | Blend of polyester of dicarboxylic acid and polycyclic bisphenol with a polyester of a dicarboxylic acid and a thiodiphenol. | Other additional dicarboxylic acid in either or both cases, other diol or diphenol in place of part of either or both diphenols. |

The polycarboxylic acid variants have been discussed above, as have the dihydroxy modifiers.

Of the dihydroxy constituents in the polyester or polycarbonate, in the final polymer whether a blend or a copolymer, the thiodiphenol comprises at least 2 mole percent and up to 50 mole percent. The preferred amount is between about 10 mole percent and 20 mole percent. Other dihydroxy constituents, when present, comprise up to about 50 percent of the dihydroxy constituent in the final polymer, a maximum of 25 percent being preferred. The three-dimensional polycyclic bisphenol comprises at least 10 mole percent (preferably at least 50 mole percent) of the dihydroxy constituent in the final blend or copolymer, and may be present in amounts as high as about 98 mole percent.

Various polymers of this invention are characterized by having high heat-softening temperatures, high heat-distortion temperatures, high moduli of elasticity, high second-order transition temperatures, and various other unusually valuable properties such as high degree of flexibility, improved stability, solubility in methylene chloride, high melting points, excellent resistance to burning when chlorine is present as a substituent, high impact strength, high Rockwell hardness, good electrical properties (high dielectric strength, high volume resistivity, low dissipation factor, and constant dissipation factor and dielectric constant over a wide frequency and temperature range), etc. Not all of these properties are present in the same degree in any given polymer; many of these groups of polymers are clearly distinct from one another. However, the polymers of this invention are generally characterized by having a surprisingly excellent combination of high melting range, high modulus of elasticity, high second-order transition temperature, and high heat-distortion temperature. As a result of this invention, valuable fibers, films, molding plastics and other synthetic resinous materials can be produced.

It would be expected in preparing polycarbonates and polyesters that decreasing the symmetry of a monomer and introducing big bulky side groups would diminish the higher temperature characteristics such as yielding a lower softening range. On the contrary, it has been found that the melting range and other properties of polycarbonates and polyesters derived from bisphenols having polycyclic structures in the connecting groups is increased as the size of the ring system increases.

It surprisingly appears that presence of the bulky group of the polycyclic ring system exerts a chain stiffening effect and also a solubilizing effect. Consequently the polymers are soluble in common organic solvents such as methylene chloride and chloroform, and yet still have very high melting points, high heat distortion temperatures, high second-order transition temperatures, etc.

The inherent viscosity of the polymers should be at least as high as 0.4 as measured in chloroform or other suitable solvent. For use in films, particularly for photographic film base, and for fiber applications the polymer should have an inherent viscosity of at least 0.5 ranging upward to about 3.0. For coatings, polymers having inherent viscosities from 0.4 to 0.7 are preferred. Best results with molding or extrusion compositions have been obtained using polymers with inherent viscosities from 0.8 to 1.2.

Surprisingly, the thiodiphenol units give increased protection against oxidation as the temperature increases. At 200° C., for instance, a 2.5-mil film of 4,4'-(2-norbornylidene)diphenol polycarbonate had a film life (became brittle on creasing) of 120 hr. in a forced-air oven at 200° C. The film life of the copolymer containing units from 10 mole percent of 4,4'-thiodiphenol was over 240 hr., an improvement of 100%. At 300° C. the film lives were 15 min. and 60 min., respectively, an improvement of 300%. This greatly improved resistance of the copolymer to oxidation at the higher temperature is particularly valuable when the polymer is to be used as a hot melt adhesive.

Polymers from the halogenated bisphenols have appreciably higher second-order transition and heat-distortion temperatures than those from the unhalogenated bisphenols. It is probable that the halogen atoms are functioning both as chain-stiffening agents and bulky side groups, thus adding to the effect of the polycyclic structure.

Since the polycyclic bisphenol polycarbonates and polyesters of this invention have excellent oxidative and thermal stability, they are suitable for use in numerous applications requiring stability at elevated temperatures. Since the polymers have exceptional electrical properties, they are particularly valuable for use as electrical insulating materials and capacitor dielectrics when operation at elevated temperatures is essential.

Nonburning films, fibers, and plastics can be obtained from the halogenated polycyclic bisphenols. The plastics which contain no halogen are self-extinguishing without dripping.

Other applications of the invention include utility as photographic film base, magnetic tape base, adhesive tape base, sheet packaging materials, protective coatings, molded components for aircraft and space vehicles, and nonburning protective clothing.

The following examples will serve to more fully illustrate some of the novel features and practices of this invention. However, it will be understood that these are but examples of specific embodiments of this invention and, therefore, not in limitation thereof. The preparative methods are described in detail in our application Ser. No. 292,139.

In the following examples, inherent viscosities are measured in chloroform at a concentration of 0.25 g./100 ml. Clear, tough films of the various copolymers are obtained by casting from a chlorinated solvent, such as methylene chloride, chloroform, etc. Tensile properties (tensile strength, elongation, and modulus) are measured on an Instron tensile tester (ASTM D882–61T, Method A). The heat-distortion temperatures are measured in a forced-convection oven as described in ASTM D1637–61 and Modern Plastics, 34 (No. 3), 169 (1956). The glass transition temperatures are taken as the temperatures at which the films distort 0.25% at a load of 5 p.s.i. when heated in the above forced-convection oven [Ind. Eng. Chem. Prod. Research and Develop., 2, 246 (1963)]. Electrical properties are determined in accordance with ASTM D150–59T and D257–61. The film life is the time required for a film to become brittle enough to crack on creasing after being heated in the forced-convection oven.

Properties of the injection-molded copolymers are determined in accordance with ASTM D1708–59T, D747–61T, D785–51 Method A, and D256–56, Method A.

The tensile shear strengths of the copolymers, tested as hot melt adhesives, are determined on precut aluminum and steel bars (ASTM D1002–64). Films 2–3 mils in thickness are placed between the specimen bars, which are then clamped together with exactly 0.5-in. overlap. The clamped specimens are then heated for 15 min. in a forced-convection oven (polycarbonate copolymers at 350° C. and polyester copolymers at 375° C.). Tensile shear strengths are determined on an Instron tensile tester. A forced-air oven is fitted around the tester for the high-temperature determinations.

Example 1

In a 3-l., three-necked flask is placed 252 g. (0.90 mole) of 4,4'-(2-norbornylidene)diphenol, 21.8 g. (0.10 mole) of 4,4'-thiodiphenol, 300 ml. of dry pyridine, and 1250 ml. of methylene chloride. While the solution is stirred and the temperature held at 25–30° C. with a cold-water bath, phosgene is passed in at a rate of about 1–2 g./min. until 98 g. has been added. The rate is then decreased to about 0.2 g./min. and addition continues until the mixture becomes very viscous. Total phosgene added is 105.2 g. The mixture is diluted with more methylene chloride, stirred with 200 ml. of water for 1 hr., and then stirred with 10% hydrochloric acid to neutralize the excess pyridine. The methylene chloride layer is thoroughly washed with water, and the polymer is then precipitated by adding methanol while stirring. After being dried, the coplymer has an inherent viscosity of 0.89. Its softening point is above 300° C.

A clear, colorless film is obtained by casting from methylene chloride. It has the following properties: tensile strength 10,500 p.s.i., modulus $3.3 \times 10^5$ p.s.i., elongation 16%, glass transition temperature 220° C., heat-distortion temperature 237° C., dielectric constant (at 0.1–100 kc.) 2.9, dissipation factor (at 0.1–100 kc.) 0–0.2%, and volume resistivity $10^{18}$ ohm cm.

A 2.5-mil film has a film life (defined previously) of 240 hr. at 200° C. and 60 min. at 300° C. Measured under these conditions, a 2.5-mil film of the homopolycarbonate containing no thiodiphenol units has a film life of 128 hr. at 200° C. and 15 min. at 300° C.

The copolymer is injection-molded, and the following properties are obtained with 1/16-in. thick tensile bars and 1/8-in. thick flexure bars: yield strength 11,000 p.s.i., elongation 20%, flexural modulus $2.6 \times 10^5$ p.s.i., Rockwell hardness L–114 and M–92, and notched Izod impact strength 1.2 ft.-lb./in. of notch. Compared to the homopolycarbonate, tensile bars of the copolymer are more resistant to oxidation and embrittlement on heating in an oven at 200° C. for 1 week. The copolymer has good oxidative stability at 200° C. as a protective coating for shaped objects. The polymer also has good tensile shear strength on aluminum and steel, determined as described above, at 200° C.

Example 2

The purpose of this example is to show the unexpected increase in glass transition temperature ($T_g$) of a polycyclic bisphenol-thiodiphenol copolycarbonate as compared to the $T_g$ of a bisphenol A-thiodiphenol copolycarbonate.

To illustrate further, according to Schnell, "Chemistry and Physics of Polycarbonates," Interscience Publishers (1964), p. 69, a copolycarbonate of equimolar amounts of bisphenol A and 4,4'-thiodiphenol has a $T_g$ of 125° C. From pp. 66–67 of the Schnell reference, it is known that the $T_g$ of the 4,4'-thiodiphenol homopolycarbonate is 113° C., and that of disphenol A homopolycarbonate is 149° C. Therefore, the presence of 50 mole percent bisphenol A in the copolycarbonate increased the $T_g$ only 12° C., an increase of 33% of the interval between the $T_g$'s of the two homopolycarbonates (113° C. and 149° C.).

When a copolycarbonate is prepared from equimolar amounts of 4,4'-thiodiphenol and our 4,4'-(2-norbornylidene) diphenol, the $T_g$ is 190° C., which is 69% of the interval between the $T_g$'s of the two homopolycarbonates (113° C. and 224° C., the latter as shown in our U.S. Ser. No. 292,139). These results are summarized in the following table.

| Bisphenol from which polycarbonate is prepared: | $T_g$, ° C. |
| --- | --- |
| 4,4'-thiodiphenol | 113 |
| Equimolar 4,4'-thiodiphenol and bisphenol A | 125 |
| Bisphenol A | 149 |
| 4,4'-thiodiphenol | 113 |
| Equimolar 4,4'-thiodiphenol and 4,4'-(2-norbornylidene) diphenol | 190 |
| 4,4'-(2-norbornylidene) diphenol | 224 |

It is very surprising that the presence of the polycyclic bisphenol in the copolymer increased the glass transition temperature of the thiodiphenol polycarbonate so much, and it is particularly surprising that the percentage increase, based on the $T_g$ interval of the two homopolymers, is twice that of the bisphenol A copolymer (69% versus 33%).

Example 3

A copolycarbonate prepared from equimolar amounts of 4,4'-(2-norbornylidene)diphenol and 4,4'-thiodiphenol by the method of Example 1 has an inherent viscosity of 1.97.

A film cast from chloroform has the following properties: tensile strength, 10,200 p.s.i., modulus $3.2 \times 10^5$ p.s.i., elongation 7%, glass transition temperature 190° C., and heat-distortion temperature 230° C. A 1.0-mil film has a film life at 200° C. in excess of 300 hr. A 1.0-mil film of the homopolycarbonate containing no thiodiphenol units has a film life of 200 hr. at 200° C.

Example 4

The copolycarbonate of Example 3 is blended with the polycarbonate of 4,4'-(3-methyl-2-norbornylmethylene) diphenol, prepared by the procedure of Example 1, to give a blend containing an average of 2 mole percent of thiodiphenol units. Blending is accomplished by dissolving the polymers in chloroform and then casting a film. Film tensile properties and heat-distortion temperature (235° C.) of the homopolycarbonate are unaffected by the blend. The film life of a 2.0-mil film of the blend at 200° C. is greater than 100 hrs., which is the film life of the homopolycarbonate. The blend has good tensile shear strength on steel at 200° C.

Example 5

A copolycarbonate is prepared from 70 mole percent of 4,4'-(decahydro-1,4-exo-5,8-endo-dimethanonaphth-2-ylidene)diphenol, 20 mole percent of bisphenol A, and 10 mole percent of 4,4'-thiobis(2-methyl)phenol. The inherent viscosity is 0.72. A film, cast from methylene chloride, has the following properties: tensile strength 10,800 p.s.i., modulus $3.4 \times 10^5$ p.s.i., elongation 10% and heat-distortion temperature 230° C. A 1.0-mil film has a film life of 100 hrs. at 220° C. A 1.0-mil film of a similar polymer containing additional bisphenol A units in place of the thiophenol units has a film life of 50 hrs. at this temperature.

Example 6

A bisphenol copolyester is prepared from the following: 0.090 mole of 4,4'-(2-norbornylidene)diphenol, 0.010 mole of 4,4'-thiodiphenol, 0.050 mole of diphenyl terephthalate, 0.050 mole of diphenyl isophthalate, and 0.4 mg. of lithium catalyst. To remove all of the air in the flask containing these components, the flask is evacuated and purged with nitrogen three times. The mixture is then melted down with stirring at 200° C. A vacuum of 180 mm. is applied, and phenol is distilled from the reaction mixture while it is heated to 225° C. during 30 min. The stirred mixture is then heated to 300° C. during 1 hr., and during this time the pressure is reduced to 20 mm. The pressure is then further reduced to 0.1 mm. and heating continued at 300° C. for 30 mins. During this time the polymer attains a very high melt viscosity and wraps around the stirrer. It is cooled under vacuum, treated with acetone to aid in hardening, and ground to pass a 20-mesh screen. The polymer is further built up in the solid phase to a higher molecular weight by heating at 0.05 mm. while the temperature is slowly raised during 2 hr. from 180° C. to 300° C. This final temperature is then held for another hour. The polymer has an inherent viscosity of 1.17.

A film cast from chloroform has the following properties: tensile strength 9,800 p.s.i., modulus $2.7 \times 10^5$ p.s.i., elongation 21%, glass transition temperature 240° C., heat-distortion temperature 252° C., dielectric constant (at 0.1–100 kc.) 3.0, dissipation factor (at 0.1–100 kc.) 0–0.2%, and volume resistivity $10^{17}$ ohm-cm. The similar polyester containing no thiodiphenol units has essentially the same properties. A 2.0-mil film has good oxidative stability and good adhesive strength at 200° C.

Example 7

A copolyester is prepared from 0.080 mole of 4,4'-(hexahydro-4,7-methanoindan-5-ylidene)diphenol, 0.020 mole of 4,4'-thiodiphenol and 0.10 mole of diphenyl trans-1,4-cyclohexanedicarboxylate by the procedure of Example 6. The polymer has an inherent viscosity of 0.64. A film, cast from chloroform, has the following properties: tensile strength 9,400 p.s.i., modulus $2.8 \times 10^5$ p.s.i., elongation 15%, and heat-distortion temperature 265° C. The copolymer has good tensile shear strength on steel at 200° C.

Example 8

Compared to similar polymers containing no thiodiphenol units, the following copolymers have improved oxidative stability at temperatures of 200° C. and higher, good high temperature adhesive properties, excellent electrical properties, and heat-distortion temperatures above 200° C. The polycarbonates are prepared by the procedure of Example 1 and the polyesters by the procedure of Example 6. Satisfactory properties are obtained when the inherent viscosities are at least about 0.4 and preferably at least 0.5.

(a) Copolycarbonate from 0.9 mole 4,4'-(2-norbornylmethylene)diphenol and 0.1 mole 4,4'-thiodiphenol.

(b) Copolycarbonate from 0.7 mole 4,4'-(hexahydro-4,7-methanoindan-5-ylidene)diphenol and 0.3 mole 4,4'-thiobis(2-chlorophenol).

(c) Copolycarbonate from 0.8 mole 4,4'-(2-norbornylidene)bis(2,6-dichlorophenol) and 0.2 mole 4,4'-thiobis(3-methyl)phenol.

(d) Copolyester from 0.080 mole 4,4'-(5,6-dimethyl-2-norbornylmethylene)diphenol, 0.020 mole 4,4'-thiobis(2,6-dimethyl)phenol, and 0.10 mole diphenyl terephthalate.

(e) Copolyester from 0.070 mole 4,4'-(2-norbornylidene)diphenol, 0.020 mole bisphenol A, 0.010 mole 4,4'-thiodiphenol, and 0.10 mole diphenyl isophthalate.

(f) Blend of a homopolyester of terephthalic acid and 4,4'-(2-norbornylidene)diphenol and of a homopolyester of terephthalic acid and 4,4'-thiodiphenol, each prepared according to Example 6, in amounts of 98% and 2%, respectively, by weight.

While the invention has been described with substantial emphasis upon the use of thiodiphenols, including alkydiphenols and halodiphenols having up to about 18 carbon atoms, it will be apparent that other aryl thiodiols may be used in addition to or in place of the thiodiphenol. Examples of such other aryl thiodiols include thiodinaphthol, etc.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A highly polymeric linear organic polyester of (A) at least one bifunctional carboxylic acid selected from the group consisting of carbonic acid and dicarboxylic acids, (B) at least 10 mole percent of at least one polycyclic gem-bisphenol having a saturated polycyclic three-dimensional structure which includes a saturated bicyclic atomic-bridged hydrocarbon ring member, and (C) from 2 up to 50 mole percent of at least one thiodiphenol, said polyester having an inherent viscosity of at least 0.4 as measured in chloroform.

2. A highly polymeric linear organic polyester as defined by claim 1 wherein said polycyclic gem-bisphenol has the general formula:

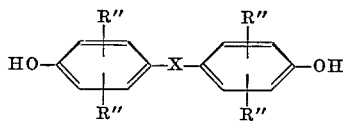

wherein R" is a member selected from the group consisting of hydrogen atoms, halogen atoms, and alkyl groups containing from 1 to 4 carbon atoms and X is a gem-bivalent radical consisting essentially of a saturated polycyclic structure which includes at least one saturated bicyclic atomic-bridged hydrocarbon ring member.

3. A highly polymeric linear organic polyester as defined by claim 2 wherein said X is selected from the group of radicals having the general formula:

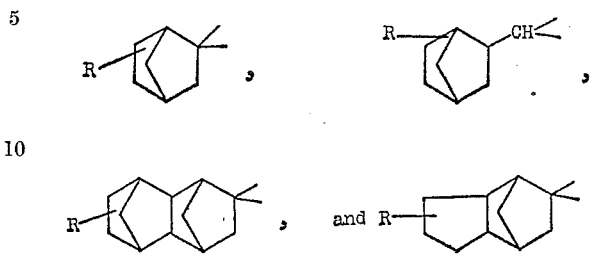

wherein R is at least one member which is attached to one or more of the polycyclic rings and is selected from the group consisting of hydrogen atoms, halogen atoms, aryl groups, and alkyl groups containing from 1 to 4 carbon atoms.

4. A highly polymeric linear organic polyester as defined by claim 1 wherein said polyester is a polycarbonate.

5. A highly polymeric linear organic polyester as defined by claim 1 wherein said polyester is a polycarbonate of (A) carbonic acid, (B) 4,4'-(2-norbornylidene)diphenol, and (C) 4,4'-thiodiphenol.

6. A highly polymeric linear organic polyester as defined by claim 1 wherein said polyester is a polycarbonate of (A) carbonic acid, (B) 4,4'-(hexahydro-4,7-methanoindan-5-ylidene)diphenol, and (C) 4,4'-thiobis(2-chlorophenol).

7. A highly polymeric linear organic polyester as defined by claim 1 wherein said polyester is a polycarbonate of (A) carbonic acid, (B) 4,4'-(2-norbornylidene)bis(2,6-dichlorophenol), and (C) 4,4'-thiobis(3-methyl)phenol.

8. A highly polymeric linear organic polyester, as defined by claim 1, of (A) terephthalic acid, (B) 4,4'-(2-norbornylidene)diphenol, and (C) 4,4'-thiodiphenol.

9. A highly polymeric linear organic polyester, as defined by claim 1, of (A) 1,4-cyclohexane dicarboxylic acid, (B) 4,4'-(hexahydro-4,7-methanoindan-5-ylidene)diphenol, and (C) 4,4'-thiodiphenol.

10. A highly polymeric linear organic polyester, as defined by claim 1, of (A) diphenyl terephthalate, (B) 4,4' - (5,6-dimethyl-2-norbornylmethylene)diphenol, and (C) 4,4'-thiobis(2,6-dimethyl)phenol.

11. A blend of (1) a highly polymeric linear organic polyester of (A) at least one bifunctional carboxylic acid selected from the group consisting of carbonic acid and dicarboxylic acids and (B) at least 10 mole percent of at least one polycyclic gem-bisphenol having a saturated polycyclic three-dimensional structure which includes a saturated bicyclic atomic-bridged hydrocarbon ring member and (2) a highly polymeric linear organic polyester of said (A) and (C) from 2 up to 50 mole percent of at least one thiodiphenol, wherein the dihydroxy constituents of said polyesters consist of from 2 up to 50 mole percent of said thiodiphenol, said polyesters having an inherent viscosity of at least 0.4 as measured in chloroform.

12. A blend as defined by claim 11 wherein (1) is a polyester of (A) terephthalic acid and (B) 4,4'-(2-norbornylidene)diphenol and (2) is a polyester of (A) terephthalic acid and (B) 4,4'-thiodiphenol.

No references cited.

MURRAY TILLMAN, *Primary Examiner.*

J. T. GOOLKASIAN, *Assistant Examiner.*